US008332087B2

(12) United States Patent
Yannacone, Jr. et al.

(10) Patent No.: US 8,332,087 B2
(45) Date of Patent: Dec. 11, 2012

(54) SYSTEM AND METHOD FOR DYNAMIC DATA MINING AND DISTRIBUTION OF MARITIME DATA

(76) Inventors: Victor John Yannacone, Jr., Patchogue, NY (US); Allen F. Labbe, Abingdon, VA (US)

( * ) Notice: Subject to any disclaimer, the term of this patent is extended or adjusted under 35 U.S.C. 154(b) by 531 days.

(21) Appl. No.: 12/595,698

(22) PCT Filed: Apr. 11, 2008

(86) PCT No.: PCT/US2008/060059
§ 371 (c)(1),
(2), (4) Date: Oct. 13, 2009

(87) PCT Pub. No.: WO2009/009184
PCT Pub. Date: Jan. 15, 2009

(65) Prior Publication Data
US 2010/0138644 A1    Jun. 3, 2010

Related U.S. Application Data

(60) Provisional application No. 60/923,270, filed on Apr. 13, 2007.

(51) Int. Cl.
*G08G 1/0968* (2006.01)
(52) U.S. Cl. .................... 701/21; 701/517; 340/989
(58) Field of Classification Search .......... 701/21, 701/420, 422, 484, 517; 340/989, 992
See application file for complete search history.

(56) References Cited

U.S. PATENT DOCUMENTS

| 3,971,018 | A | | 7/1976 | Isbister et al. |
| 4,706,090 | A | * | 11/1987 | Hashiguchi et al. ............ 342/41 |
| 5,307,074 | A | | 4/1994 | Janex |
| 5,404,135 | A | * | 4/1995 | Janex ............................ 340/988 |
| 5,515,287 | A | * | 5/1996 | Hakoyama et al. ........... 701/301 |
| 5,633,644 | A | * | 5/1997 | Schussler et al. ............. 342/455 |
| 5,666,648 | A | | 9/1997 | Stuart |
| 5,754,429 | A | * | 5/1998 | Ishihara et al. ................ 701/468 |
| 5,983,161 | A | * | 11/1999 | Lemelson et al. ............ 701/301 |
| 6,249,241 | B1 | * | 6/2001 | Jordan et al. .................... 342/41 |
| 6,463,419 | B1 | * | 10/2002 | Kluss .............................. 705/80 |
| 6,469,664 | B1 | | 10/2002 | Michaelson et al. |
| 6,658,349 | B2 | * | 12/2003 | Cline ............................ 701/517 |
| 7,286,914 | B2 | * | 10/2007 | Cerchione et al. .............. 701/21 |
| 7,747,710 | B1 | * | 6/2010 | Osburn et al. ................. 709/220 |
| 7,990,263 | B2 | * | 8/2011 | Morrell .................... 340/539.13 |
| 2001/0054961 | A1 | | 12/2001 | Twining |
| 2002/0023010 | A1 | | 2/2002 | Rittmaster et al. |
| 2002/0049660 | A1 | | 4/2002 | Obrador et al. |
| 2003/0233176 | A1 | | 12/2003 | Cerchione et al. |

* cited by examiner

*Primary Examiner* — Joseph Rocca
*Assistant Examiner* — Timothy Wilhelm
(74) *Attorney, Agent, or Firm* — The Webb Law Firm

(57) ABSTRACT

A system for dynamically collecting and distributing maritime data includes a vessel configured to transmit at a predetermined time, or upon electronic inquiry, a signal representative of a current location of the vessel or an expected location of the vessel; a computer network including one or more databases, each of which includes one or more zone of concern data, wherein the zone of concern data corresponds to a zone of concern; and a service provider configured to receive the signal, retrieve the one or more zone of concern data from the computer network based upon the signal and transmit the one or more zone of concern data to the vessel. The zone of concern data, which may be continually changing, may be sent from the service provider to the vessel on a continuous basis with respect to the changing location and heading of the vessel.

20 Claims, 3 Drawing Sheets

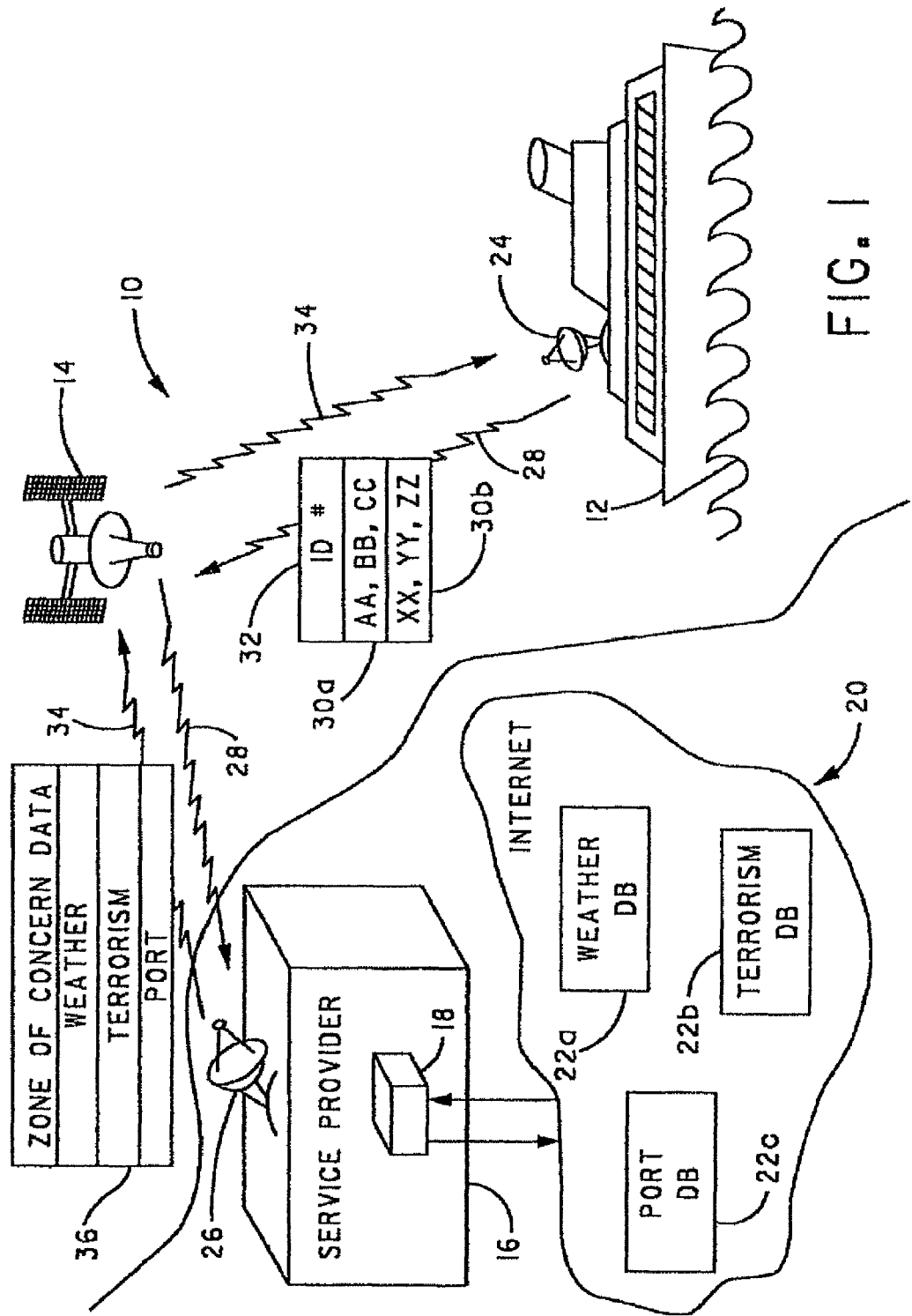

SYSTEM AND METHOD FOR DYNAMIC DATA MINING AND DISTRIBUTION OF MARITIME DATA

CROSS REFERENCE TO RELATED APPLICATIONS

This application claims the benefit of U.S. Provisional Application Ser. No. 60/923,270, filed Apr. 13, 2007, and entitled "System and Method for Dynamic Data Mining and Distribution of Maritime Data", the contents of which are hereby incorporated herein by reference.

BACKGROUND OF THE INVENTION

1. Field of the Invention

The present invention is directed to a method and apparatus for dynamically collecting and distributing relevant timely maritime data to a vessel based upon its actual location and/or expected location.

2. Description of Related Art

Maritime vessels, including commercial, research, governmental, and recreational vessels, require accurate and readily available information while at-sea or in-port. The Internet is replete with information that would be conducive to the safe, secure and economical operation of a vessel, critical to the success of the vessel's voyages and the survival of the crew. Such information may include, but is not limited to, weather data, accident data, health crises data, piracy data, terrorism data, open warfare data, disease data, emergency re-routing data, political unrest data, and port contact information data, to name a few. It would be desirable to make this information directly and readily available to a vessel in terms of its actual location at the time the information is needed. Currently, however, there are obstacles that prevent the efficient implementation of this objective.

The above-identified types of information are usually stored in Internet accessible disparate databases having proprietary data structures. Traditionally, an on-shore support team assigned to the vessel receives a request for information from the vessel. The vessel is required to transmit its location, so that the on-shore support team can properly query the appropriate databases and provide information relevant to the vessel's location. Due to the proprietary nature of each of the databases, the on-shore support team is required to format database queries according to the type of database from which any of the above-identified types of information is sought. The resultant data must then be clearly and concisely communicated to the vessel. Unfortunately, this process introduces a significant amount of latency from the moment the request for information is transmitted by the vessel until the fulfillment of that request by the on-shore support team.

In common practice, the world's commercial vessels do not carry the specialized communications gear that would allow them direct access to any such digital information archived on the Internet. Even if a ship could achieve a secure and reliable connection to the Internet at sea, the current cost of satellite communications would make it prohibitively expensive to search such archives and retrieve any findings. This is especially true if the database returns an exorbitant amount of data, thereby consuming a great deal of communications bandwidth and/or communications time. Additionally, many of the databases that contain the information required to respond to a request are slow-opening. For example, a database that provides a user with information about facilities and services available in some 5,000 ports would take the user almost 30 minutes to open and access the information stored in an owning agency's deeply archived, unimproved database when employing the most commonly used 57.6 kbps modem. Such a delay is unacceptable to ships at sea facing real-time emergencies.

Heretofore, there is no system for efficiently collecting relevant maritime data upon the request of a vessel and then distributing the data to the vessel. It is, therefore, desirable to overcome the above problem and others by providing a system where a service provider maintains a dynamic link to several databases and responds to a request from a vessel by transmitting current maritime data to the vessel while consuming a minimal amount of bandwidth and incurring a reduced amount of latency in the transmission of the data. Furthermore, it is desirable for the maritime data to be transmitted to the vessel in response to the vessel indicating its current location or expected location after a set period of time. It is also desirable to allow the vessel to make general and/or specific maritime data requests.

Recent maritime law established that each ship-owning or ship-leasing company appoint a company security officer (CSO) who will have under their command ship security officers (SSOs) for each ship in the company fleet. In order to improve the CSO's span of control over their far-flung SSOs, powerful tools are required, which, until development of the present invention, have been unavailable, even to the United States Navy and Coast Guard. In the last decade the extent and nature of piracy radically changed. Just five years ago the most common reported act of piracy or robbery was theft of a rope. The sudden introduction of heavy weapons, rocket-propelled grenades and mortars, combined with new connections among various criminal organizations, and sheer brutality have deepened the threat of piracy to world's seaborne commerce. As an example, the world's most competent pirates sit in the Straits of Malacca, astride shipping channels through which one-half of the world's goods and one-third of its oil pass. Globally, piracy is estimated to now cost some $18 billion US dollars a year. Known terrorist organizations are now considering enlisting pirates for their naval operations.

Pirates have become very clever at probing the merchant fleet for weaknesses, whether concentrating their attacks at shipping choke points, learning when crew attentiveness is at its lowest, or singling out certain types of low-freeboard ships for attack. In response, the ship masters and security officers must be equipped with a variety of ways to understand and counter the tactics of pirates. This is accomplished by first identifying the ruses used, common boarding points, port-by-port analyses of modus operandi, pirate competence, and ship type criminology.

In sharp contrast to the burgeoning skill sets of the pirates, the information available to the commercial fleet consists primarily of electronically distributed piracy alerts. Though brief recitations, treasure troves of valuable information can to be found, but only through intense analysis of the data. For example, piracy alerts coming from over thirty sources are scattered, sometimes inaccurate and in dire need of parsing.

Still other desirable features of the invention will become apparent to those of ordinary skill in the art upon reading and understanding the following detailed description.

SUMMARY OF THE INVENTION

Accordingly, we have invented a system of collecting and distributing maritime data. The system includes a vessel configured to transmit a signal representative of a current location of the vessel and/or an expected location of the vessel to a service provider via a satellite communications network. A pre-determined zone of concern is established for each vessel.

The zone of concern is either a three-dimensionally distance-bounded area surrounding the vessel or a time-bounded area surrounding the vessel or both. The service provider is configured to receive the signal and based upon the signal, retrieves one or more zone of concern data from databases in a computer network. The zone of concern data corresponds to maritime related information relevant to the zone of concern of the vessel. This may include, but is not limited to weather data, accident data, health crises data, piracy data, terrorism data, open warfare data, disease data, emergency re-routing data, political unrest data, coast guard assistance data, navigation lights data, reef data, shipwreck data and port contact information data. The service provider then transmits the zone of concern data to the vessel via the satellite communications network.

It is desirable for this system to maintain, update, integrate, and transmit maritime data received from various maritime related databases. The system minimizes the amount of communications bandwidth and/or communications time required to transmit the data to the vessel. By utilizing this system, a vessel need not inquire about any specific dangers, but is automatically informed of all known dangers or other relevant information that may be useful to the vessel. Additionally, the on-shore support team's role will be absorbed and/or enhanced by this system. Furthermore, each request and request fulfillment may be logged by the service provider, so that if some unfortunate incident were to befall a vessel, a record of the immediate zone of concern data corresponding to the vessel's location, and perhaps the cause of the vessel's distress, may be reviewed. By subscribing to the system, not only will a vessel minimize the risk of encountering maritime dangers, but it may also benefit by obtaining discounted insurance rates from the insurance companies who insure the vessel and/or the vessel's cargo.

In one embodiment of the present invention, a system is configured to collect and distribute maritime data. The system may include a water-faring vessel, a computer network, and a server. The water-faring vessel is configured to transmit a signal representative of (i) a current location of the vessel or (ii) an expected location of the vessel. The computer network includes a plurality of databases, wherein each of the plurality of databases includes at least one zone of concern data set that is continually updated. The zone of concern data corresponds to occurrences associated with a zone of concern. The server, which may be operated by a service provider is configured to (a) receive the signal from the vessel; (b) receive at a first time from the plurality of databases zone of concern data based upon the signal; (c) store the zone of concern data retrieved at the first time; (d) transmit the zone of concern data retrieved at the first time to the vessel; (e) receive at a second time from the plurality of databases zone of concern data based upon the signal; (f) store the zone of concern data retrieved at the second time; (g) compare the zone of concern data retrieved at the first time to the zone of concern data retrieved at the second time; and (h) transmit the zone of concern data retrieved at the second time to the vessel if the zone of concern data retrieved at the second time is different from the zone of concern data retrieved at the first time.

In another embodiment of the present invention, the system includes (a) means for receiving a signal from a water-faring vessel, wherein the signal is representative of (i) a current location of the vessel or (ii) an expected location of the vessel; (b) means for formulating a query as a function of (i) the location of the vessel or (ii) the expected location of the vessel; (c) means for transmitting the query at a first time and then at a second predefined time or interval to a plurality of databases remote from the server and the vessel; (d) means for receiving at a first time and at a second time from the plurality of databases zone of concern data; (e) means for storing the zone of concern data retrieved at the first time and at the second time; (f) means for transmitting the zone of concern data retrieved at the first time to the vessel; and (g) means for comparing the zone of concern data retrieved at the first time to the zone of concern data retrieved at the second time, wherein the means for transmitting the zone of concern data retrieved at the first time is further configured to transmit the zone of concern data retrieved at the second time to the vessel if the zone of concern data retrieved at the second time is different from the zone of concern data retrieved at the first time. The system may also be configured to designate the zone of concern data retrieved at the first time and zone of concern data retrieved at the second time as representative of the zone of concern data stored on the vessel.

The system may also be configured such that (a) the means for storing the zone of concern data retrieved at the first time and at the second time is further configured to store an intended designated route of the vessel, wherein the designated route represents locations through which the vessel is intended to pass; and (b) the means for transmitting the zone of concern data retrieved at the first time is further configured to transmit a request for the current location of the vessel and receive the current location thereof. The system may further comprise means for determining if the current location corresponds to any of the locations through which the vessel was intended to pass. If the current location does not correspond to any of the locations through which the vessel was intended to pass, the system may (a) formulate a second query as a function of the current location of the vessel; (b) transmit the second query to the plurality of databases; (c) receive at a third time from the plurality of databases zone of concern data; (d) store the zone of concern data retrieved at the third time; and (e) transmit the zone of concern data retrieved at the third time to the vessel. Optionally, the system may designate the zone of concern data retrieved at the third time as representative of the zone of concern data stored on the vessel.

A method for collecting and distributing maritime data may include the steps of: (a) receiving a signal from a water-faring vessel, wherein the signal is representative of (i) a current location of the vessel or (ii) an expected location of the vessel; (b) formulating a query as a function of (i) the location of the vessel or (ii) the expected location of the vessel; (c) transmitting the query to a plurality of databases remote from the server and the vessel; (d) receiving at a first time from the plurality of databases zone of concern data; (e) storing the zone of concern data retrieved at the first time; (f) transmitting the zone of concern data retrieved at the first time to the vessel and optionally designating the zone of concern data retrieved at the first time as representative of the zone of concern data stored on the vessel; (g) transmitting the query again at a predefined time or interval to the plurality of databases; (h) receiving at a second time from the plurality of databases zone of concern data; (i) storing the zone of concern data retrieved at the second time; (j) comparing the zone of concern data retrieved at the first time to the zone of concern data retrieved at the second time; and (k) transmitting the zone of concern data retrieved at the second time to the vessel if the zone of concern data retrieved at the second time is different from the zone of concern data retrieved at the first time, and optionally designating the zone of concern data retrieved at the second time as representative of the zone of concern data stored on the vessel.

Still other desirable features of the invention will become apparent to those of ordinary skill in the art upon reading and understanding the following detailed description, taken with the accompanying drawings, wherein like reference numerals represent like elements throughout.

BRIEF DESCRIPTION OF THE DRAWINGS

FIG. 1 is a schematic diagram of entities and communication links involved in a system for collecting and distributing maritime data;

DETAILED DESCRIPTION OF THE INVENTION

Figure 2A:
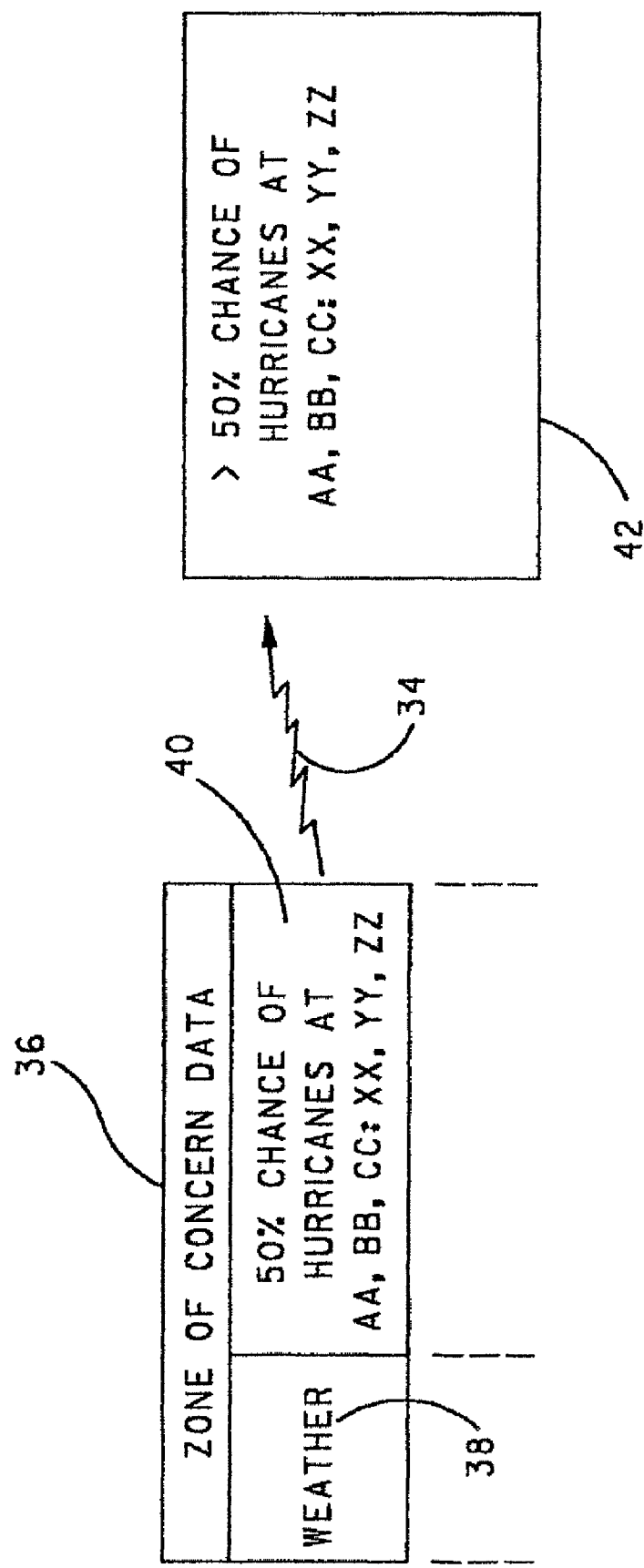
FIG. 2a is a schematic diagram of zone of concern data transmitted to a vessel and a corresponding display of the zone of concern data as it appears to the vessel.

The present invention will now be described with reference to the accompanying figures. It is to be understood that the specific system illustrated in the attached figures and described in the following specification is simply an exemplary embodiment of the present invention. For purposes of illustration, exemplary maritime related information and databases containing relevant maritime data will be described. Additionally, exemplary communications within the system are described as satellite and land-line based. However, these examples are not to be construed as limiting the invention in any manner.

With reference to FIG. 1, the entities and the communicative connectivity between the entities within a system 10 for collecting and distributing maritime data will now be described. In a desirable embodiment, system 10 includes a vessel 12 communicatively connected via a satellite 14 to a service provider 16. Service provider 16 maintains one or more servers 18 connected via a computer network 20, such as the Internet, to one or more databases, such as databases 22a-c. The databases 22a-c may either be remote or local to the one or more servers 18.

Vessel 12, may include, but is not limited to commercial, research, governmental, and recreational vessels. In the desirable embodiment, vessel 12 is equipped with a two-way communications system, such as a vessel satellite transmitter/receiver 24. It is to be understood that vessel 12 may utilize other forms of communications systems, including, but not limited to radio, microwave, and laser. In terms of a user interface, the two-way communications system may utilize email, a browser, or other suitable software or hardware. Vessel satellite transmitter/receiver 24 is able to transmit and receive data to and from satellite 14, as part of a satellite communications network. The satellite communications network may be any data-capable transmission network, such as Inmarsat, a global mobile satellite communications service utilized by the maritime industry. Such a satellite communications network employs world-spanning, geo-synchronous satellites 14, to allow vessel 12 to communicate from virtually any body of water.

Service provider 16 transmits and receives data to and from vessel 12. In the desirable embodiment, service provider 16 utilizes a service provider satellite transmitter/receiver 26 in communication with satellite 14. Thus, a communications link is made between vessel 12 and service provider 16. It is to be understood that any communications between vessel 12 and service provider 16 may be encrypted, so as not to alert potential pirates or commercial competitors of the vessel's status, location, heading, etc. Any suitable encryption algorithms or other secure methods ensuring private communications may be utilized. It is also to be understood that service provider 16 may utilize other forms of communication to transmit and receive data to and from satellite 14. For example, service provider 16 may be connected via a land line to a satellite communications intermediary (not shown), which is responsible for any satellite transmissions. Service provider 16 may include one or more servers 18. Server 18 is configured to process satellite communications data. Additionally, server 18 is connected via computer network 20 to databases 22a-c. It is to be understood that server 18 may access any number of databases connected to computer network 20. Server 18 is also configured to process any data received from databases 22a-c.

In the desirable embodiment, representative databases 22a-c, namely, weather database, terrorism database and port database, respectively, contain up-to-date information in the form of data that is relevant to the safe, secure and economical operation of vessel 12. This information may be critical to the success of the vessel's voyage and the survival of its crew. Such information may include, but is not limited to weather data, accident data, health crises data, piracy data, terrorism data, open warfare data, disease data, emergency re-routing data, political unrest data and port contact information data. For example, weather database 22a may contain weather-related information, such as ocean current and storm data. Terrorism database 22b may provide terrorism-related information, which may include data on possible terrorist activity within an area, either at-sea or near a port. Port database 22c may include port information, such as recommended facilities and services available to a vessel's crew members. It is to be understood that a database in the broad sense may encompass a database system, wherein one or more individual databases reside. Thus, more than one of the above types of data may be found within a database. Furthermore, it is to be understood that a database may reside locally with service provider 16 in the form of a database including archived zone of concern data.

Representative databases 22a-c may be publicly accessible or may be privately accessible. For example, terrorism database 22b may be a Central Intelligence Agency operated database accessible to the public, whereas weather database 22a may be operated by a private entity that expends time and finances to maintain data on current worldwide weather conditions. Weather database 22a would therefore require service provider 16 to enter into a contract or license agreement with the database owner in order to access weather database 22a.

Since a different database owner may maintain each database, the structure and accessibility of each database may be proprietary. This requires that queries to a database are presented in a specific and precise format. For example, some databases may not be relational databases and, therefore, traditional query languages, e.g., SQL, may be ineffective in obtaining the data contained therein. Similarly, some purely web-based databases are only accessible through HTML forms. In effect, due to the proprietary nature of each database, service provider 16 is required to format each database query according to the type of database from which data is being sought. In addition to the proprietary nature of each database, each database is dynamic, in that the database owner continually updates the contents of the database, as new data becomes available. Therefore, it would be impractical for the relevant databases to simply be copied and placed on server 18 of service provider 16. To overcome this limitation, service provider 16 may establish real-time dynamic links with each database in order to extract the information demanded by the requesting vessel 12 at the time the inquiry is received. After the proper query is submitted by service provider 16, each database is configured to send the resultant data to server 18. The foregoing database examples are not to be construed as limiting, since it is to be understood that server 18 may be configured to access any type of database.

With continuing reference to FIG. 1, the operation of system 10 will now be described. Initially, vessel 12 enters into a subscription plan with service provider 16, whereupon service provider 16 agrees to collect, process and transmit relevant maritime related information to vessel 12. Service provider 16 may also provide vessel 12 with any requisite hardware or software required to implement system 10, although, it is to be understood that most vessels 12 are capable of receiving Internet derived data through their existing communications systems. Desirably, service provider 16 has implemented various protocols that allow for data transmissions to be transmitted to either standard or proprietary Inmarsat browsers situated on vessel 12.

In the desirable embodiment, vessel 12, while either at-sea or in-port, transmits a vessel signal 28 to service provider 16. Vessel signal 28 includes the vessel's location, preferably in latitudinal and longitudinal terms, 30*a* and 30*b*, respectively, and preferably expressed in a Degree Minute Second (DMS) format. Additionally, a unique identifier 32 is transmitted, that enables service provider 16 to identify vessel 12 and to verify the subscription plan of vessel 12. Alternatively or in addition to its present location, vessel 12 may transmit its expected location, either in terms of DMS or by current heading and nautical speed data. By transmitting this information to service provider 16, vessel 12 expects to receive immediate and accurate maritime information relevant to the safe, secure and economical operation of vessel 12 along the outlined course.

Each vessel 12 is deemed to have a zone of concern associated with it. A zone of concern may be defined as a three-dimensionally distance-bounded, a time-bounded area, or both, extending away from and surrounding vessel 12. For example, the zone of concern may be set as a 100 nautical mile radius in any direction from vessel 12. Similarly, the zone of concern may be set as encompassing 36 hours of estimated travel time from the present location of vessel 12 along a particular route. It is to be understood that a zone of concern is dynamic, in that it may change according to the present location of the vessel 12. Maritime related information that may be relevant to the zone of concern may be represented as zone of concern data. This may include, but is not limited to, weather data, accident data, health crises data, piracy data, terrorism data, open warfare data, disease data, emergency re-routing data, political unrest data, coast guard assistance data, navigation lights data, reef or shipwreck data and port contact information data, to name a few.

Once service provider 16 receives vessel signal 28, server 18 parses vessel signal 28 and creates the appropriate database queries. A query may contain the location of vessel 12 and optionally, the distance-bounded or time-bounded area relative to the location of vessel 12. As previously mentioned, due to the proprietary nature of each database, some of the database queries require a specific and precise format. Each query references either the precise or relative geographic location of vessel 12. This requires that server 18 convert the location of vessel 12, as transmitted by the vessel 12, into a format that is in keeping with the proprietary format for each database queried. For example, the DMS format utilized by the vessel 12 may need to be converted to a Degree Decimal format. Alternatively, the DMS format may need to be converted to a corresponding geographic region name, which is broader than the specific DMS format. Desirably, this conversion would be made on server 18 by utilizing a look-up table, or other suitable data structure. Thus, the query would not include the location of the vessel in a DMS format, but rather, would contain the geographic region name.

Consequently, server 18 queries each of databases 22*a-c*, either simultaneously, or in turn. The process of querying each database may be referred to as web crawling. Each database is responsive to the query's location of vessel 12, and optionally, the distance-bounded and/or time-bounded area relative to the location of vessel 12. The database then returns the corresponding zone of concern data to server 18. For example, if a query is submitted to weather database 22*a*, based upon the location embedded in the query, weather database 22*a* may return weather related zone of concern data, indicating that there is a mild northerly ocean current, with a 20% chance of hurricanes, and potential swells up to 5 feet in height within the immediate area. If the query also contains a distance-bounded area of 100 nautical miles from the current location of the vessel 12, the weather database may return additional information, indicating that 40 nautical miles north of the current position of the vessel 12 there is a strong northerly ocean current, with a 50% chance of hurricanes, and potential swells up to 20 feet in height. Zone of concern data may also encompass information not directly related to the safety of vessel 12. For example, a query to port database 22*c* may return information regarding the nearest port and the facilities and services offered, in relation to the current location of the vessel. This information may be useful, if for example, immediate medical attention is required of a crew member, requiring vessel 12 to come in-port.

If server 18 utilizes a real-time dynamic link to database 22, the data contained within database 22 has been previously repositioned on server 18 in a format that allows for almost instantaneous retrieval of the data (e.g., cached data). A traditional connection to a database may result in a greater latency between the time a query is submitted by server 18 and the time data is returned to server 18. Regardless of the database connection, it is to be understood that service provider 18, as opposed to vessel 12, directly retrieves the zone of concern data from the various databases 22*a-c*. As previously mentioned, not all databases may be relational databases, thereby requiring the download of the entire database, as opposed to downloading only the returned data. This is especially true if the database is in the form of a non-indexed list. Due to the prohibitive bandwidth time and cost involved with having to transmit the entire non-indexed list to vessel 12, service provider 16 is required to process the list to derive the requested zone of concern data. For example, a 5,000 port database in a non-indexed list may be reformatted by service provider 16 into 5,000 individual pages, allowing each port to become a unique index identifier. This allows data corresponding to each port to be more quickly accessed. It is to be understood that service provider 16 may utilize various techniques to search, retrieve, and manage zone of concern data from the various databases 22*a-c*. An additional time-saving technique involves server 18 locally archiving zone of concern data on a database managed by service provider 16. In the desirable embodiment, at predetermined intervals, server 18 transmits broad or generic queries to databases that are infrequently modified. The zone of concern data that is returned is then stored or updated in archival form in the database managed by service provider 16. If all or part of a request from vessel 12 can be fulfilled by zone of concern data residing on the database managed by service provider 16, then data retrieval will be almost instantaneous, as the extent of the necessary web crawling will be reduced.

After receiving the zone of concern data, server 18 is required to process the zone of concern data. Each of the various databases 22*a-c* may return zone of concern data having disparate formats or containing extraneous non-relevant information. Thus, server 18 may manipulate the zone of concern data in various ways, including, but not limited to adding to the data, re-arranging the data, reformatting the data, and stripping the zone of concern data of non-essential data. For example, if the zone of concern data indicates that there are unfavorable weather conditions near vessel 12, service provider 16 may append the zone of concern data with information relating to alternate routes to avoid the unfavorable weather conditions. The manipulation of the data may result in a more concise, thorough, and efficient transmission of the zone of concern data to vessel 12. By knowing the identity of vessel 12 that made the request for the zone of concern data, the server is able to format any outgoing zone of concern data into a format that is properly recognized, interpreted and displayed by vessel 12. For example, vessel 12 may implement a legacy or proprietary Inmarsat browser, as opposed to a standard Inmarsat browser. Thus, the zone of concern data formatted for a standard browser may not be compatible with a legacy browser. Additionally, system 10 must take into account that each of the major Inmarsat global mobile satellite communications providers may provide vastly different proprietary browsers.

With reference to FIG. 2a and with continuing reference to FIG. 1, the properly formatted zone of concern data is then transmitted by service provider 16 via a service provider signal 34 to vessel 12 as a zone of concern data packet 36. Zone of concern data packet 36 may include a zone of concern category 38 and a corresponding zone of concern text 40. For example, as illustrated in FIG. 2a, zone of concern category 38 may be entitled "Weather" and the corresponding zone of concern text 40 may be "50% chance of hurricanes at AA,BB, CC:XX,YY,ZZ." It is to be understood that vessel 12 may receive service provider signal 34 while either at-sea or in-port. It is also to be understood that in addition to transmitting zone of concern data packet 36 to vessel 12, zone of concern data packet 36 may also be transmitted simultaneously to the on-shore support team assigned to and responsible for vessel 12. In the desirable embodiment, the two-way communications system of vessel 12 receives service provider signal 34, consequently parses zone of concern data packet 36 and thereby extracts the zone of concern data. The zone of concern data is then displayed within an email browser 42 of vessel 12. For example, email browser 42 in FIG. 2a displays "50% chance of hurricanes at AA,BB,CC:XX,YY,ZZ."

Thus, the crew members of vessel 12 will have immediate and accurate maritime information relevant to the safe, secure and economical operation of vessel 12 in relation to the present location and/or expected location of the vessel 12. In effect, by utilizing system 10, previously inaccessible data is automatically provided to vessel 12. Furthermore, vessel 12 is not required to inquire about any specific dangers, but is automatically informed of all known dangers or other relevant information that may be useful to vessel 12. This may also be implemented by having vessel 12 transmit a request for zone of concern data based upon a predetermined schedule, such as once per day. Additionally, the vessel may manually make a general request for zone of concern data at any other time.

System 10 may also be configured to allow vessel 12 to make a specific request for information, in addition to a general request for zone of concern data. A specific request involves vessel 12 formulating a query that indicates to service provider 16 that vessel 12 requires specific information, such as a list of port agents in a specific country. A specific request may be entered into email browser 42 as either a simplified search string or a phrase. For example, if vessel 12 requires a list of all port agents in South Africa, vessel 12 would formulate and transmit a query such as "*South_Africa%Port_Agent*". Similarly, if vessel 12 requires a list of port agents in Cape Town, South Africa, the query may be formulated as "South_Africa%Port_Agent%Cape_Town*". The query is then transmitted to service provider 16. Server 18 interprets the query and determines the proper database 22 for which to formulate its own query. After receiving the requested specific data from the database 22, as with a general request for zone of concern data, service provider 16 processes and then transmits the specific data to vessel 12.

Figure 2B:
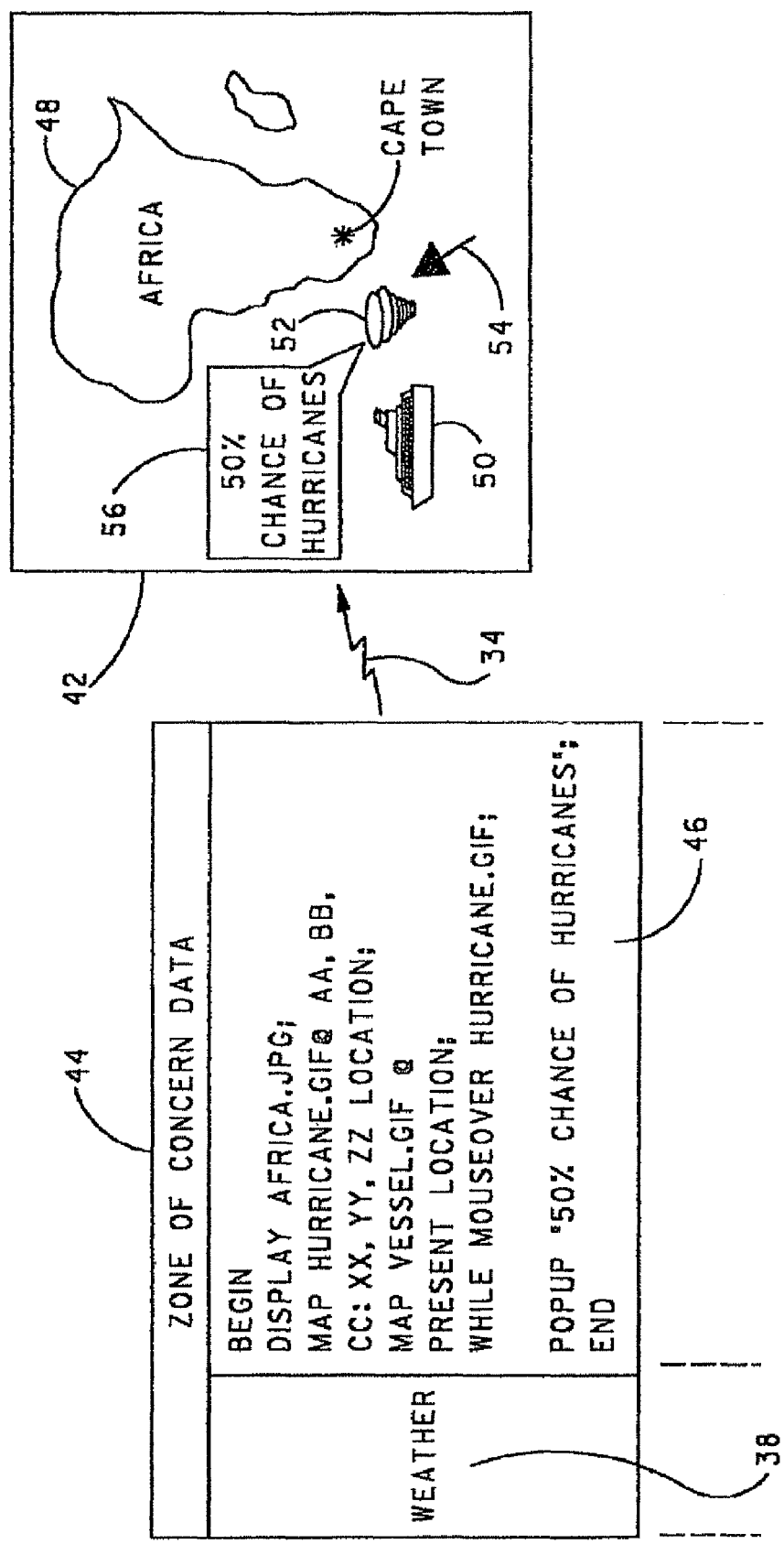
FIG. 2b is a schematic diagram of programmatic zone of concern data transmitted to the vessel and a corresponding display of the programmatic zone of concern data as it appears to the vessel.

With reference to FIGS. 2a and 2b, and with continuing reference to FIG. 1, FIG. 2b depicts an alternative embodiment zone of concern data packet 44. Similar to zone of concern data packet 36, the alternative embodiment zone of concern data packet 44 may include zone of concern category 38. Either, in addition to, or as a substitution to the zone of concern text 40, the alternative embodiment zone of concern data packet 44 includes programmatic data 46. Programmatic data 46 permits service provider 16 to present the zone of concern data in a more detailed or user-friendly manner. For example, programmatic data 46 may enable viewing of the zone of concern data in a dynamic, user-interactive, graphical format. This may be implemented by having vessel 12 maintain a local data set onboard. The local data set may include relatively static data that would be too time-consuming and cost prohibitive to be sent with each alternative embodiment zone of concern data packet transmission. Static data may include, but is not limited to, object images such as highly detailed vector-referenced maps. For example, object images may include, a map of Africa 48 (including its surrounding bodies of water), a vessel image 50, and a hurricane image 52. The static data may be stored in various computer readable medium, including, but not limited to a CD-ROM or a hard disk drive, and is to be accessible by the two-way communications system of vessel 12. It is to be understood that updates to the static data may also be transmitted while the vessel is in transit.

In processing the zone of concern data received from databases 22a-c, server 18 manipulates and formats the zone of concern data into programmatic data 46 compatible with email browser 42 of vessel 12. It is to be understood that the term "programmatic data" encompasses not only any suitable programming language, but is also inclusive of interpretive and scripted languages, such as HTML and JavaScript, respectively. Programmatic data 46 is then transmitted by service provider 16 via service provider signal 34 to vessel 12 as alternative zone of concern data packet 44. In the desirable embodiment, the two-way communications system of vessel 12 receives service provider signal 34, parses alternative embodiment zone of concern data packet 44 and extracts programmatic data 46. Depending upon the type of programmatic data 46 utilized, programmatic data 46 is then either compiled and executed, or is interpreted. This results in the zone of concern data to be displayed within email browser 42 of vessel 12. For example, programmatic data 46 depicted in FIG. 2b is exemplary pseudo-code that causes email browser 42 to display the zone of concern data in a dynamic, user-interactive, graphical format. Specifically, various static data from the local data set are depicted within email browser 42. The map of Africa 48 is placed within email browser 42. Vessel image 50 is placed on the map of Africa 48 according to the real-life latitudinal and longitudinal present location of vessel 12. Hurricane image 52 is placed on the map of Africa 48 at a location of hurricane activity, as indicated by weather database 22a. An example of a user-interactive element is the ability of the crew member of the vessel 12 to move his or her mouse-pointer 54 over any of the images displayed in email browser 42. This results in a pop-up 56 to appear that provides a more detailed description corresponding to the current activity illustrated in the email browser 42. For example, moving mouse-pointer 54 over hurricane image 52 results in the pop-up 56 to display "50% chance of hurricanes". An example of a dynamic element is the ability for the images to be automatically repositioned within email browser 42 as more current zone of concern data is received. For example, although the map of Africa 48 remains static, the positions of the vessel image 50 and hurricane image 52 may change depending upon the locations of vessel 12 and the hurricane activity, respectively.

In another embodiment, the present invention is able to parse general piracy alerts into various discrete fields of like data. Exemplary fields of data include Total Numbers of Attacks; Competency (Success vs. Failure Rates); Casualties (Injuries, Kidnappings, Murders); Damage to Ship/Ship Lost; Stand-Off Distances; Preferred Methods of Attack; Victim Analysis; Ships Prone to Attack; Types of Weapons Used; Country-Specific Dangers and Other Measures of Lawlessness; Response of Port Authorities to Distress Calls; and Bases of Operation and Points of Origin for Each Attack. The operation of the present invention is based on dynamic statistical analysis of a relational meta database of one or more databases concerning piracy. Techniques such as cluster, factor, and discriminant analysis, as well as methods of data mining may be employed to determine geographically specific best protection and response recommendations, which can be communicated in real-time to CSOs on shore and their SSOs at sea. The need for simultaneity in distributing information about impending dangers is met, in part, by providing instantaneous information to CSOs and SSOs via the Internet (e.g., website access) and email, either using conventional terrestrial communications circuits or shipboard satellite communication systems.

In an exemplary embodiment, the system continuously determines and evaluates Country-Specific Dangers from information and intelligence services and the news media which report a wide variety of dangers including types and degrees of conflict, disease, crime, terrorism, piracy, natural disasters. This information can be obtained from various organizations or database sources maintained by the CDC (Centers for Disease Control); National Center for Infectious Disease; CTMP (Canada, Health Canada, Travel Medicine Program); CTR (Canada's Travel Reports); FCO (Britain, Foreign and Commonwealth Office Traveling Overseas); ICC (International Chamber of Commerce Weekly Piracy Report); ONI (U.S. Navy, Office of Naval Intelligence Worldwide Threat to Shipping); OSAC (U.S. Department of State, Overseas Security Advisory Council Electronic Database); POGT (U.S. Department of State, Counterterrorism Office, Patterns of Global Terrorism 2002); USSD (U.S. Department of State); Travel Warnings; Public Announcements; Travel Advisories; Consular Information Sheets; WHO (World Health Organization Communicable Disease Surveillance and Response), among others.

Country-Specific Piracy is compiled as source reports become available from ONI, which polls twenty organizations for information including the Piracy Reporting Center in Kuala Lumpur (PRC) to generate its weekly reports, the International Maritime Organization IMO, and News media. This data provides piracy, terrorism, and military action information for individual countries and insight into the systemic conditions that foster the growth of piracy. The reports also provide information about pirate competency in terms of the success and failure attack rates. For example, comparison of successful attacks to unsuccessful attacks range from 90% unsuccessful to 80% successful, depending upon the ports involved. The disparity in success rates equates to the pirate competency. The total number of attacks is drawn from ONI and IMO reports and the News media weekly and quarterly to identify piracy hotspots for each country.

Weapons Employed data is pulled from ONI and IMO reports weekly and quarterly and indicates how individual pirate groups prepare for combat. The type of weapons carried by pirate gangs increases the degree of danger. Reports show that well-armed pirates actually pose less of a threat to personnel as they tend to use their weapons as tools of persuasion, rather than for mindless shooting. Conversely, for example, the lightly armed coastal and river pirates in Bangladesh account for more maiming and deaths than do the better-armed Indonesians. There is also a very large group of pirates who carry no weapons but rely on stealth and access to a quick escape route. The presence of weapons raises the risk and underscores the rule that any attack that results in boarding is deemed a successful attack.

Casualty information is drawn from ONI and IMO reports weekly and quarterly. Casualty data is a measure of cruelty. Usually ship crews are passive once the ship's security has been breached and therefore a great deal of the injuries and deaths can be contributed to cruelty or vengeance. Kidnappings occur often as they have proved to be profitable for the pirates; however, most often negotiations led to the release of those kidnapped.

Attack methods are obtained from ONI and IMO reports weekly and quarterly. Certain categories of ships or ship types are more vulnerable than others. The design of certain ships makes them easy to board and hard to defend. Pirates, in particular ports, specialize in climbing anchor chains or seizing tugs or employing grappling hooks or favor a stem approach because the stern is a blind spot on the ship's radar. Relating methods to ports improves defense preparation.

Port Responsiveness Information is drawn from ONI and IMO reports weekly and quarterly and is an indication of what type, magnitude, and timeliness can be expected from a port authority when a request for help concerning piracy is transmitted. When a ship has slowed, is anchored or tied up, it is susceptible in becoming a piracy target.

Modus Operandi data drawn from ONI and IMO reports weekly and quarterly identifies successful piracy attempts to highlight the successful approaches used by pirates when boarding a ship. Pirates have only a limited number of ways to board and take control of a ship. The inclusion of this data makes it possible for SSOs to become familiar with the pirates' limited repertoire and fashion defenses accordingly.

Research and analysis of ONI and IMO reports weekly and quarterly combined with geo-referencing allows geographical profiling to determine the closest shore reference point to the attack. Stand-off distances are derived from the data processing and analysis performed in determining the Bases of Operation. In a study of the history of piracy worldwide it is found that only two places have been listed with stand-off distances: Remain 50 miles off the coast of Somalia and 100 miles off the Yemeni coast. This leaves no guidance for the rest of the pirate-infested waters around the world. 95% of all piracy attacks on ships underway occur within 50 miles of the coastline, yet there is little guidance provided to the maritime industry about these danger zones.

The system of the present invention includes a suitable risk assessment algorithm that reconstitutes a meta-database, situated either locally to or remotely from the server), for threats of human origin as an element of a larger meta-database that includes a number of other danger factors not of human origin, such as severe weather, and icebergs, seismic activity, and any other hazards. Using historical data permits ship owners to implement a predictive model that can be employed in negotiating a shipping contract on a port-to-port basis. The system is configured to map complex dynamic data to a geospatial model of the ship route in real-time with constant geospatial updates. Accordingly, a ship's captain can utilize the present invention to weigh their decision as to whether or not he should enter a particular port or determine the amount of preparation needed to thwart a possible attack when entering a danger zone, or zone of concern. Furthermore, the system includes predictive models of threats, risks, and hazards associated with a particular route or port-of-call, which can be employed by ship owners in negotiating shipping contracts.

The system of the present invention is implemented through the use of artificial intelligence (AI) and neural network systems that can perform the requisite real-time data mining. An AI engine, combined with the risk assessment algorithm can process data from many sources at many levels of detail and over many disparate time periods into meaningful information and intelligence. Collection of data is automated using dynamic links and parsing methods capable of gathering and combining data from disparate databases. Once data is gathered, it is weighted by the AI engine as to its importance and impact on the safety of the vessel, again using a suitable algorithm designed to consider the importance of each category with respect to the safety of vessels. The resultant information is then mapped to the geospatial model.

Generally speaking, the present invention is designed to encompass technology and systems from a variety of diverse and disparate fields to create a practical system for reducing risk and improving safety at sea. The gathering and distribution of zone of concern data has evolved into a sophisticated and analytical process in direct response to the increasingly complex relationships between and among criminal, pirate and terrorist operations as well as natural hazards such as storms, rogue waves, underwater seismic events, and rapidly changing geopolitical events.

To this end, the system may encompass an n-dimensional meta-database of many individual databases, each of which may or may not contain information relevant to the safety of a ship at sea at a particular time and location during its voyage. Information about the multiple dangers to mariners at sea may be drawn from a wide variety of sources which do not present their data in any common format (e.g., the National Safety System (NSS), which includes the public Notice to Mariners, List of Lights, Sea Anomalies, and Navigational Warnings). Many of the individual databases in the meta-database are themselves meta-databases (e.g., the Threats of Human Origin meta-database database is made up of many different databases concerning piracy). A method of geo-referencing the disparate data types in each of the individual databases of the meta-database includes utilizing latitudinal and longitudinal coordinates. Other geo-referencing aspects may be time-based in various increments and a variety of types of altitude information, such as height of cloud cover and wave height and depth to and type of bottom.

The present invention includes the ability to map complex dynamic data to a geospatial model of the vessel's route in real-time with constant geospatial updates. Additionally, the system provides for ascertaining relevancy in terms of a vessel's present position and its anticipated position at a future time. The length of time required to reach an anticipated future position of the vessel in the context of the relevant information (e.g., weather information, may be relevant up to 72 hours ahead of present position depending on the season of the year and the area of ocean or sea the vessel is traversing) may be determined. Each relevant item of data contained in any of the individual databases of the meta-database may be dynamically mapped in real-time to the location of the vessel at sea at a present time and over a period of time determined by the extent of the area of concern that the information drawn from that particular database dictates.

The system is configured to utilize multi-dimensional geographical information mapping methods and multimedia display technology. For example, a pseudo three-dimensional model of the vessel route (desirably 300 nautical miles wide and 36 hours at present speed long) may be displayed (e.g., in email browser 42) in addition to other information including atmospheric information to a height relevant to the vessel and the weather patterns in the area of concern, hydrographic information to depths relevant to the vessel configuration, and course options. The physical display of information may be implemented via a video display.

The system is configured to continuously update each of the individual databases in the meta-database in real-time. In one embodiment, the system may be aware of the extent to which changes or updates have been made in the various individual databases. Accordingly, the n-dimensional meta-database may be updated accordingly. It is to be understood that the updated data may then be mapped to the vessel-specific geospatial model and only the relevant changed data is transmitted to the vessel 12.

With respect to the transmission of data, the system may utilize low-cost, high speed plain language inquiries of the entire meta-database in the context of a vessel-specific need by whatever communications system is available to the vessel 12 at the time of need. This may include, but is not limited to using conventional terrestrial communications circuits or shipboard satellite communication systems together with the Internet and email. As previously discussed, the present invention provides for "pulling" of relevant maritime data via corresponding ship-initiated queries.

The present invention also provides for "pushing" of data from the service provider 16 to the ship. The service provider 16 can dynamically provide the vessel 12 with relevant zone of concern data with respect to the position and/or heading of the vessel 12. In other words, the service provider 16 provides relevant information on a continuous basis to the vessel 12 during the vessel's journey. For example, if the service provider 16 is aware that the current heading of the vessel 12 will result in the vessel 12 traveling through an area identified as having a high rate of piracy, the service provider 16 may preemptively warn the vessel 12 of the upcoming potential danger. This passive information distribution method differs from any active information distribution method in that the vessel 12 or, more importantly, the operator, will not be required to constantly transmit queries for information relating to a current area or upcoming area into which the vessel 12 will travel. In one exemplary implementation, the server 18 of the service provider 16 may be configured to cache the data received from the databases 22a-c and transmitted to the vessel 12. This allows the service provider 16 to have an accurate record in real-time of the exact zone of concern data that exists on the vessel 12. As previously discussed, the server 18 may be configured to query one or more of the databases 22a-c at predetermined times or intervals and obtain the most recent zone of concern data for the zone of concern relevant to the vessel 12. The server 18 is configured to compare the cached data or datasets with the most recently received zone of concern data and determine if there are any differences in the data. Any such differences would be indicative to the server 18 that the vessel 12 would need to be apprised of changes to its current maritime data or zone of concern data. Accordingly, the service provider 16 would "push" the new zone of concern data to the vessel 12.

In one embodiment of the present invention, the service provider 16 may be made aware of the designated route of the vessel 12 prior to the vessel 12 navigating such a route. From time to time, the service provider 16 may obtain the current location of the vessel 12, for example, by pinging the vessel's communications system (e.g., via transmitter/receiver 24). Upon detection of any deviation between the designated route and the current location or heading, the service provider 16 may transmit to the vessel 12 new or updated zone of concern data relevant to the current location or heading of the vessel 12. The information transmitted to the vessel 12 may also include a warning message indicative of the vessel 12 deviating from the designated route.

The service provider 16 may determine that the vessel 12 has deviated from its designated route by comparing the cached data residing on the server 18 with the data residing on the vessel 12. If there is a discrepancy between the two sets of data, then the discrepancy would be indicative of the vessel 12 having deviated from its designated route. In other words, at one time, the vessel 12 had requested zone of concern data for a particular position and/or heading inconsistent with the vessel's present route. Upon any detected deviation, the cache of the server 18 may be updated to reflect the zone of concern data currently associated with the vessel 12. Additionally, protocols may be implemented at the service provider 16 such that the on-shore support team assigned to and responsible for vessel 12 would be notified once the service provider 16 is made aware that the vessel 12 has deviated from its designated route. It is to be understood that the server 18 may include the necessary processing hardware and software to effect the aforementioned functionality.

The invention has been described with reference to the desired embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A system for collecting and distributing maritime data, comprising:
   a communications system on-board a water-faring vessel, the communications system configured to transmit a signal representative of (i) a current location of the vessel or (ii) an expected location of the vessel; and
   a server in communication with a computer network that includes a plurality of databases, wherein each of the plurality of databases includes at least one zone of concern data that is continually updated, wherein the zone of concern data corresponds to occurrences associated with a zone of concern, wherein:
   the server is configured to:
      receive the signal from the communications system;
      receive at a first time from the plurality of databases zone of concern data based upon the received signal;
      store the zone of concern data received at the first time;
      transmit the zone of concern data received at the first time to the communications system;
      receive at a second time from the plurality of databases zone of concern data based upon the received signal;
      store the zone of concern data received at the second time;
      compare the zone of concern data received at the first time to the zone of concern data received at the second time; and
      transmit the zone of concern data received at the second time to the communications system if the zone of concern data received at the second time is different from the zone of concern data received at the first time.

2. The system of claim 1, wherein the zone of concern is (i) a three-dimensionally distance-bounded area surrounding the vessel or (ii) a time-bounded area surrounding the vessel.

3. The system of claim 2, wherein the server is operative for:
   formulating a query as a function of (i) the current location of the vessel or (ii) the expected location of the vessel; and
   transmitting the query to the plurality of databases.

4. The system of claim 3, wherein the zone of concern data includes (i) accident data, (ii) health crises data, (iii) piracy data, (iv) terrorism data, (v) open warfare data, (vi) disease data, (vii) emergency re-routing data, (viii) political unrest data, (ix) coast guard assistance data, (x) navigation lights data, (xi) reef data, (xii) shipwreck data, or (xiii) port contact information data.

5. The system of claim 3, wherein the signal further comprises a unique identifier identifying the vessel.

6. The system of claim 3, wherein one or more satellites:
   receive the signal from the vessel;
   transmit the signal to the service provider;
   receive the zone of concern data from the server; and
   transmit the zone of concern data to the vessel.

7. The system of claim 3, wherein the server is operative for:
   formatting the zone of concern data to be compatible with an email browser of the vessel; and
   stripping the zone of concern data of any non-essential data.

8. The system of claim 7, wherein the server is operative for formatting the one or more zone of concern data into programmatic data and transmitting the programmatic data to the vessel.

9. The system of claim 8, wherein the vessel includes a local data set, wherein the local data set is at least one object image, and wherein the vessel is operative for:
   receiving the programmatic data;
   executing the programmatic data in the presence of the local data set; and
   displaying information as a result of executing the programmatic data, wherein the information is representative of the zone of concern data in relation to the local data set.

10. The system of claim 9, wherein the vessel is operative for displaying the information in:
   (i) a graphical format;
   (ii) a dynamic format; or
   (iii) a user-interactive format on the email browser of the vessel.

11. The system of claim 3, wherein the server is operative for encrypting the zone of concern data into an encrypted zone of concern data and transmitting the encrypted zone of concern data to the vessel.

12. The system of claim 3, wherein the server is operative for querying each of the databases at pre-determined times.

13. The system of claim 1, wherein the plurality of databases is remote from the server and the vessel.

14. A system for collecting and distributing maritime data, comprising:

means for receiving a signal from a water-faring vessel, wherein the signal is representative of (i) a current location of the vessel or (ii) an expected location of the vessel;

means for formulating a query as a function of (i) the current location of the vessel or (ii) the expected location of the vessel;

means for transmitting the query at a first time and then at a second predefined time or interval to a plurality of databases remote from the server and the vessel;

means for receiving at a first time and at a second time from the plurality of databases in response to the transmission of the query the first time and the second time, respectively, zone of concern data;

means for storing the zone of concern data received at the first time and at the second time;

means for transmitting the zone of concern data received at the first time to the vessel; and means for comparing the zone of concern data received at the first time to the zone of concern data received at the second time, wherein the means for transmitting the zone of concern data received at the first time is further configured to transmit the zone of concern data received at the second time to the vessel if the zone of concern data received at the second time is different from the zone of concern data received at the first time.

15. The system of claim 14, further comprising means for designating the zone of concern data received at the first time and zone of concern data received at the second time as representative of the zone of concern data stored on the vessel.

16. The system of claim 14, wherein the zone of concern data corresponds to occurrences associated with a zone of concern, and the zone of concern is (i) a three-dimensionally distance-bounded area surrounding the vessel or (ii) a time-bounded area surrounding the vessel, wherein the zone of concern data is (i) accident data, (ii) health crises data, (iii) piracy data, (iv) terrorism data, (v) open warfare data, (vi) disease data, (vii) emergency re-routing data, (viii) political unrest data, (ix) coast guard assistance data, (x) navigation lights data, (xi) reef data, (xii) shipwreck data, or (xiii) port contact information data.

17. The system of claim 14, wherein:

the means for storing the zone of concern data received at the first time and at the second time is further configured to store an intended designated route of the vessel, wherein the designated route represents locations through which the vessel is intended to pass;

the means for transmitting the zone of concern data received at the first time is further configured to transmit a request for the current location of the vessel and receive the current location thereof, wherein the system further comprises:

means for determining if the current location corresponds to any of the locations through which the vessel was intended to pass and, if the current location does not correspond to any of the locations through which the vessel was intended to pass, formulating a second query as a function of the current location of the vessel;

transmitting the second query to the plurality of databases;

receiving at a third time from the plurality of databases zone of concern data;

storing the zone of concern data received at the third time; and transmitting the zone of concern data received at the third time to the vessel and optionally designate the zone of concern data received at the third time as representative of the zone of concern data stored on the vessel.

18. The system of claim 17, wherein the means for determining is further configured to inform an on-shore support team responsible for the vessel that the vessel has deviated from the designated route.

19. A method for collecting and distributing maritime data, comprising the steps of (a) receiving a signal from a water-faring vessel, wherein the signal is representative of (i) a current location of the vessel or (ii) an expected location of the vessel;

(b) formulating a query as a function of (i) the current location of the vessel or (ii) the expected location of the vessel;

(c) transmitting the query of step (b) to a plurality of databases remote from the server and the vessel;

(d) in response to transmitting the query in step (c), receiving at a first time from the plurality of databases zone of concern data;

(e) storing the zone of concern data received at the first time;

(f) transmitting the zone of concern data received at the first time to the vessel;

(g) transmitting the query of step (b) again at a predefined time or interval to the plurality of databases;

(h) in response to transmitting the query in step (g), receiving at a second time from the plurality of databases zone of concern data;

(i) storing the zone of concern data received at the second time;

(j) comparing the zone of concern data received at the first time to the zone of concern data received at the second time; and (k) transmitting the zone of concern data received at the second time to the vessel if the zone of concern data received at the second time is different from the zone of concern data received at the first time.

20. The method of claim 19, further comprising the steps of:

storing an intended designated route of the vessel, wherein the designated route represents locations through which the vessel is intended to pass;

transmitting a request for the current location of the vessel and receive the current location thereof; and determining if the current location corresponds to any of the locations through which the vessel was intended to pass and, if the current location does not correspond to any of the locations through which the vessel was intended to pass, formulating a second query as a function of the current location of the vessel;

transmitting the second query to the plurality of databases;

receiving at a third time from the plurality of databases zone of concern data;

storing the zone of concern data received at the third time; and transmitting the zone of concern data received at the third time to the vessel and optionally designate the zone of concern data received at the third time as representative of the zone of concern data stored on the vessel.

* * * * *

UNITED STATES PATENT AND TRADEMARK OFFICE
CERTIFICATE OF CORRECTION

| | | |
|---|---|---|
| PATENT NO. | : 8,332,087 B2 | Page 1 of 1 |
| APPLICATION NO. | : 12/595698 | |
| DATED | : December 11, 2012 | |
| INVENTOR(S) | : Victor J. Yannacone, Jr. et al. | |

It is certified that error appears in the above-identified patent and that said Letters Patent is hereby corrected as shown below:

In the Claims

Column 17, Line 10, Claim 14, delete "the server" and insert -- a server --

Column 18, Line 19, Claim 19, delete "the server" and insert -- a server --

Signed and Sealed this
Eighth Day of April, 2014

Michelle K. Lee
*Deputy Director of the United States Patent and Trademark Office*